United States Patent [19]

Cassels

[11] 4,288,163

[45] Sep. 8, 1981

[54] LASERS ANGULAR RATE SENSOR

[75] Inventor: Ian G. Cassels, Dundee, Scotland

[73] Assignee: Ferranti Limited

[21] Appl. No.: 78,814

[22] Filed: Sep. 25, 1979

[30] Foreign Application Priority Data

Sep. 27, 1978 [GB] United Kingdom ............ 38274/78

[51] Int. Cl.³ .......................................... G01C 19/64
[52] U.S. Cl. ................................................. 356/350
[58] Field of Search .............................. 356/350, 351

[56] References Cited

U.S. PATENT DOCUMENTS

| | | | |
|---|---|---|---|
| 3,373,650 | 3/1968 | Killpatrick | 356/350 |
| 3,390,606 | 7/1968 | Podgorski | 356/350 |
| 3,484,169 | 12/1969 | Skalski et al. | 356/350 |
| 4,152,072 | 5/1979 | Hutchings | 356/350 |

Primary Examiner—Vincent P. McGraw
Attorney, Agent, or Firm—Kerkam, Stowell, Kondracki & Clarke

[57] ABSTRACT

A ring laser comprises a closed optical path defined by two mirrors and a partially-reflecting surface, and one arm of the path includes a laser active medium which produces two counter-rotating beams. The partially-reflecting surface diverts part of each beam by way of an optical energy reflecting device so that the two diverted beams intersect in a plane to produce an interference pattern. An optical grating of similar period to the pattern is located adjacent to and parallel to the plane of the interference pattern, and a detector is located so as to detect movement of the resulting Moiré fringe pattern.

8 Claims, 5 Drawing Figures

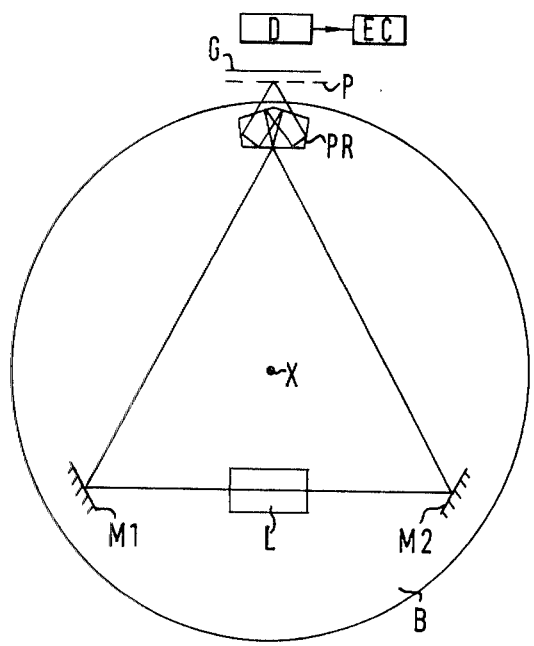
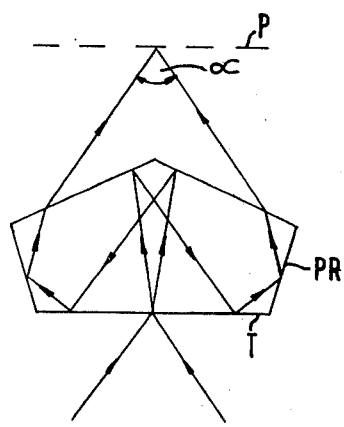
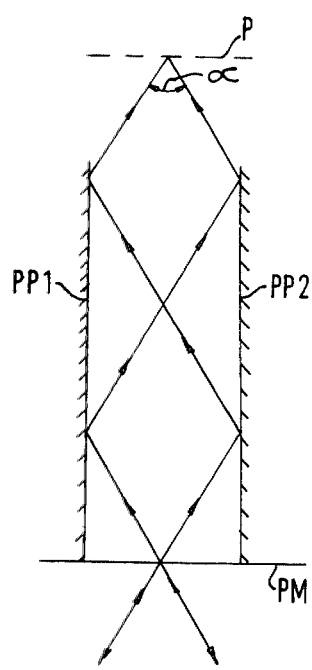
Fig. 1.
Fig. 2.
Fig. 3.

LASERS ANGULAR RATE SENSOR

This invention relates to ring lasers, and in particular to the measurement of the output from a ring laser.

A ring laser comprises a laser active medium and pumping source located within a closed optical cavity such that two beams of radiation circulate around the cavity in opposite directions. The cavity as defined by a number of mirrors and may have three or more legs, but commonly the cavity is defined by three mirrors defining a triangular light path, with the active medium located between one pair of mirrors. Two of the mirrors are fully reflecting, whilst the third mirror allows a small part of each of the two beams to pass through it. A further optical element directs these two output beams towards a detector array which detects movement of the resultant interference fringe pattern. The angle at which the two output beams meet has to be kept small so that the fringes produced are sufficiently widely spaced to make their detection easy. This imposes tight tolerances on the optical system of the ring laser.

According to the present invention there is provided a ring laser which includes a laser active medium, two or more optical energy reflecting devices and a partially-reflecting device arranged around a closed path such that laser energy generated in the active medium circulates as two counter-rotating beams around the closed path, the partially-reflecting device being arranged to divert a small part of the energy in each beam out of the closed path, an optical energy reflecting element located so as to direct the diverted parts of the counter-rotating beams of energy towards one another to produce an interference pattern in a plane outside the closed path, an optical grating located in a plane adjacent to and parallel to that of the interference patterns and comprising a series of parallel lines spaced from one another at a pitch equal to or slightly different from that of the interference pattern, and a detector arranged to detect the presence and movement of any Moiré fringe pattern set up by the relative movement of the interference pattern and the grating.

The invention will now be described with reference to the accompanying drawings, in which:

FIG. 1 is a schematic plan view of a ring laser according to an embodiment of the invention;

FIG. 2 is an enlarged view of part of the ring laser of FIG. 1;

FIG. 3 is an enlarged view of part of an alternative embodiment;

Figure 4:
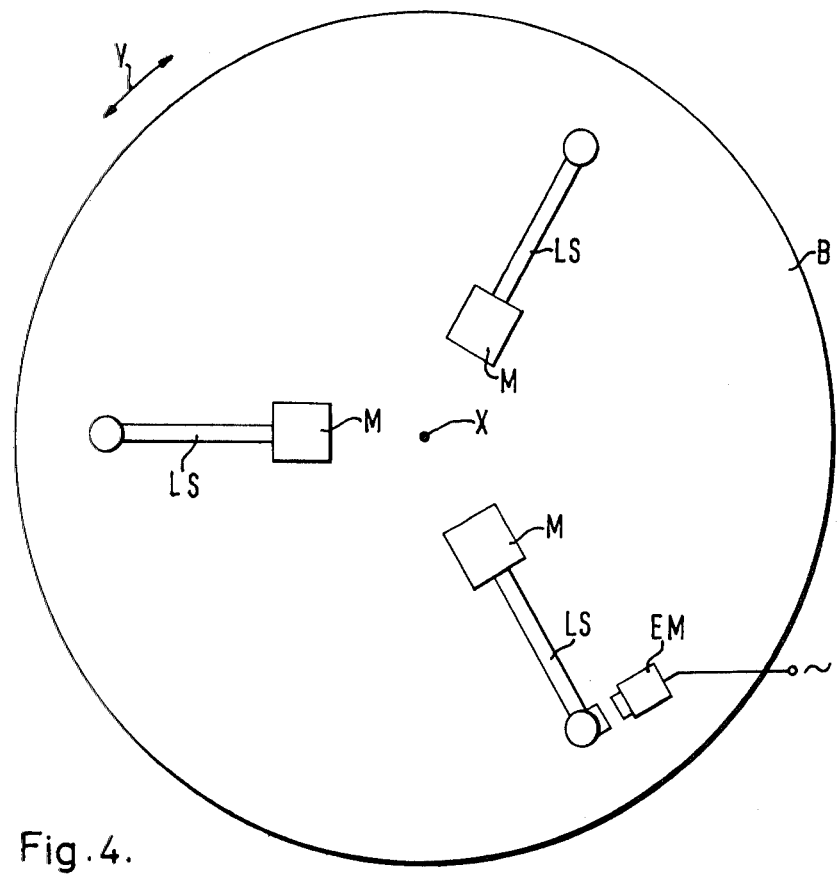
FIG. 4 is a view of the underside of a ring laser according to the embodiment of FIG. 1.

Referring now to FIG. 1, a ring laser comprises a pair of fully reflecting mirrors M1 and M2 and a prism PR, the base of which is partially-reflecting surface having a reflectivity of the order of, say, 99.8% together defining an optical path in the form of an equilateral triangle. In practice the fully-reflecting mirrors will pass a very small amount of the radiation incident upon it. One of the sides of the optical path contains a laser active medium L, together with the pumping source (not shown) necessary to stimulate the medium to emit coherent radiation and to cause it to amplify such radiation passing through it in either of two opposite directions. The laser medium and pumping source may take any of a number of well-known forms. The components described above operate to produce two beams of coherent radiation passing around the optical path in opposite directions, referred to hereafter as "two counter-rotating beams".

A small amount of radiation from each of the counter-rotating beams passes through the partially-reflecting surface, and this diverted energy from each beam is directed towards a point at which the two diverted beams interact to form an interference pattern in a plane P.

The ring laser so far described is of conventional form. In such a ring laser the spacing of the fringes of the interference pattern is inversely related to the angle of intersection of the beams which form the fringes. In order to provide reasonably widely spaced fringes, for each of detection, the angle has to be very small, as stated earlier. The ring laser of FIG. 1 avoids the problems which this causes by including an optical grating G of conventional type in a plane adjacent to and parallel to the plane of the interference pattern. The grating comprises a transmissive grating having a large number of closely-spaced parallel lines. If the lines have the same pitch as the interference pattern, then it is necessary to skew the grating lines at a slight angle to the lines of the pattern. If on the other hand, the grating pitch is slightly different from that of the interference pattern, then the lines of the two gratings may be parallel to one another. This is conventional practice in Moiré fringe applications, as is the form of the detector D and electronic circuitry EC necessary to provide the necessary output. This output indicates the sense and magnitude of any movement of the Moiré fringe pattern produced by the relative movement between the grating and the interference pattern.

The spacing S between the lines of an interference fringe pattern is determined by the wavelength $\lambda$ of the radiation and the angle $\alpha$ between the interfering beams of radiation, and is given by $$S = \frac{\lambda}{2\sin\alpha/2}$$

Hence for an angle $\alpha$ of 60° the spacing S is equal to the wavelength $\lambda$. Although it would be difficult to produce a detector operable to detect individual lines of the interference pattern at a spacing of, say, 0.633 $\mu$m, it is possible to introduce a grating of this pitch and detect the resulting Moiré fringes.

Ring lasers are commonly used as angular rate sensors, any rotation of the ring laser as a whole resulting in the two counter-rotating beams changing frequency in different senses, that is the frequency of one increases whilst the frequency of the other decreases. These frequency changes result in movement of the fringe pattern. One problem with ring lasers is that at very low rotational rates the frequencies of the two beams tend to resonate or lock together, and the rotation is thus not detected. In order to overcome this, it is common practice to mount the entire system, except for the detector D, on a base B which may be caused to vibrate in a rotational manner about an axis X perpendicular to the plane containing the optical path of the laser. Movements of the fringe pattern due to this vibration can be cancelled out using circuitry conventional in so-called "dithered" ring laser systems.

In order to achieve the desired dither cancellation it is necessary to ensure that the diverted parts of the two counter-rotating beams meet in the same sense as the beams themselves. That is, if one beam approaches the partially-reflecting surface PR from the left of the second beam, then the diverted part of the one beam must approach, the diverted part of the second beam from the left. As shown in FIG. 1, and in more detail in FIG. 2, the prism PR carries out this function of the optical energy reflecting element as well as that of the partially-reflecting device, Referring to FIG. 2, the prism is a five-sided prism with its base T forming the partially-reflecting surface. The radiation which passes through the base T of the prism from each beam is reflected within the prism, and emerges to intersect the other beam at the angle α in the plane P of the interference pattern. The value of the angle α is determined by the geometry of the prism.

There are many other ways of ensuring that the two diverted beams meet in the correct sense. FIG. 3 illustrates one method, using a partially-reflecting mirror PM and two parallel plane mirrors PP1 and PP2. Two reflections of each diverted beam provide the necessary alignment. In this case the angle α will be the same as the angle between the counter-rotating beams as they strike the partially-reflecting surface. If the mirrors PP1 and PP2 are not parallel then the angle α will be different.

When designing a dithered system several of the parameters of the system are inter-related. For example, the required period of the interference pattern should be decided first, in relation to the period of the available Moiré fringe grating. By using the expression given above this determines the angle α. For correct dither cancellation this determines the distance L between the plane of the grating and the centre of rotation of the laser system. This centre of rotation should be at the centre of mass of the base B. The distance L between the plane of the grating and the centre of rotation of the laser system can be shown to be given by the expression $$L = \frac{4AS}{\lambda P}$$

where A is the area of the laser "ring" and P is its perimeter.

In particular, for a ring laser in the form of a triangle having an inscribed circle of radius r, then $A = \frac{1}{2} Pr$ and hence $$L \frac{2rS}{\lambda},$$

for complete dither cancellation.

Figure 5:
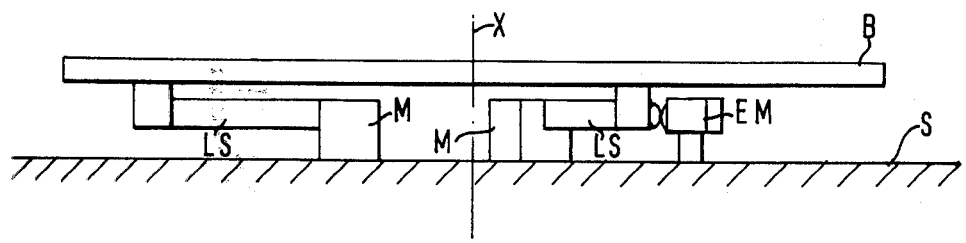
FIG. 5 is a side view of part of the laser of FIG. 4.

FIGS. 4 and 5 illustrate one way in which the mechanical dither may be applied to the ring laser. For the sake of clarity the components carried on the base B have been omitted. FIG. 4 shows the underside of the base, and from FIGS. 4 and 5 it will be seen that the base B is supported on a surface S by means of three resilient leaf spring LS. Each spring has one end attached to the base, whilst the other end of each spring is secured to a mounting block M secured to the surface S.

The table is caused to vibrate as indicated by the arrow Y by means of an electromagnet EM to which is applied an alternated current at the appropriate frequency. The electromagnet acts on a metal mass attached to one of the mountings securing a leaf spring LS to the base B. Other techniques may be used for vibrating the base. Conveniently, though by no means essential, the base may be vibrated at its own natural frequency.

What we claim is:

1. A ring laser which includes a laser active medium, two or more optical energy reflecting devices and a partially-reflecting device arranged around a closed path such that laser energy generated in the active medium circulates as two counter-rotating beams around the closed path, the partially-reflecting device being arranged to divert a small part of the energy in each beam out of the closed path, an optical energy reflecting element located so as to direct the diverted parts of both of the counter-rotating beams of energy towards one another to produce an interference pattern in a plane outside the closed path, and of such form that the diverted parts of the counter-rotating beams of energy intersect with one another in the same sense as that in which the counter-rotating beams strike the partially-reflecting device, an optical grating located in a plane adjacent to and parallel to that of the interference pattern and comprising a series of parallel lines spaced from one another at a pitch equal to or slightly different from that of the interference pattern, and a detector arranged to detect the presence and movement of any Moiré fringe pattern set up by the relative movement of the interference pattern and the optical grating.

2. A ring laser as claimed in claim 1 in which the optical energy reflecting device comprises a pair of mirrors having their reflecting surfaces facing one another.

3. A ring laser as claimed in claim 2 in which the pair of mirrors are parallel to one another.

4. A ring laser as claimed in claim 1 in which the optical energy reflecting device comprises a prism having as one of its faces the partially-reflecting device.

5. A ring laser as claimed in claim 1 in which the pitch of the optical grating is the same as that of the interference pattern and the grating is arranged with its lines slightly skew with respect to the lines of the pattern.

6. A ring laser as claimed in claim 1 in which the pitch of the optical grating is slightly different from that of the interference pattern, and the grating is arranged with its lines parallel to those of the pattern.

7. A ring laser as claimed in claim 1 in which the detector includes at least two light-sensitive devices and electric circuit means responsive to the outputs of those devices to provide an output indicative of the sense and magnitude of any movement of the Moiré fringe pattern.

8. A ring laser as claimed in claim 1 which includes a rotatable base on which are mounted the laser active medium, the two optical energy reflecting devices, the partially-reflecting device and the optical energy reflecting element, and means for mechanically vibrating the base through a small angle about an axis perpendicular to the plane of the closed path.

* * * * *